Feb. 16, 1960

J. A. HAMILTON 2,924,907

FISHLINE ATTACHMENT

Filed July 8, 1957

JOHN ANDREW HAMILTON
INVENTOR

HUEBNER, BEEHLER & WORREL
ATTORNEYS

BY Richard M. Worrel

Feb. 16, 1960 J. A. HAMILTON 2,924,907
FISHLINE ATTACHMENT
Filed July 8, 1957 2 Sheets-Sheet 2

JOHN ANDREW HAMILTON
INVENTOR
HUEBNER, BEEHLER & WORREL
ATTORNEYS
BY Richard M. Worrel

United States Patent Office 2,924,907
Patented Feb. 16, 1960

2,924,907

FISHLINE ATTACHMENT

John Andrew Hamilton, Fresno, Calif.

Application July 8, 1957, Serial No. 670,422

2 Claims. (Cl. 43—43.13)

The present invention relates to fishline attachment and more particularly to a combined fishline stabilizer, fish attractor, and depth and directional central device adapted to be attached to a fishline.

This invention deals with several problems of fishing to which preliminary reference is made for descriptive convenience. For trolling purposes, it is conventional to utilize a spinner for luring the fish. The usual arrangement provides a leader of fine wire or other material having an end connected to a fishhook and an opposite end conected to a swivel. One or more spinners are rotatably connected to the leader between the swivel and the hook. The fishline is connected to the swivel so that, theoretically at least, rotation of the spinner will not twist the line. However, it has been found that such a swivel is not always effective with the result that the spinner does twist the line. In an effort to prevent this from happening, it has been known to connect an elongated rectangular clear plastic rudder plate in the line ahead of the swivel to resist rotation of the line. Even this has not fully solved the problem and furthermore, is inadequate in other respects. It has also been known to use a weight to minimize line rotation and tangling. This also has not been fully effective.

A further aspect of the invention deals with depth positioning of a fishhook. It is known, for example, that the hook must be very deeply submerged for salmon trolling. Weights have been almost exclusively used for this purpose in the past. Otherwise, however, weights are undesirable attachments on the line especially when a fish bites since the weight gives the fish something to pull against in effort to tear free of the hook. To counteract this, devices have been provided which automatically release the weight after a predetermined time delay or incident to pulling of the fish on the hook. With such an arrangement, the weight is expendable thereby resulting in additional expense and inconvenience.

In addition, it is frequently desirable to position the hook at one side or the other of a moving boat for trolling purposes and to constrain the hook to travel along a predetermined path substantially parallel to the boat.

Accordingly, it is an object of the present invention to provide a combined fishline stabilizer, fish attractor, and depth and directional control device adapted for attachment to a fishline.

Another object is to minimize twisting of a fishline, especially as a result of the action of a spinner.

Another object is adjustably to control the depth of a fishhook and attached line during trolling operations.

Another object is to enable submersion of a fish lure by other means than the mere use of a weight.

Another object is to minimize expense and inconvenience in fishing, especially at various depths.

Another object is to control the path of travel of a fishhook and attached line during trolling.

Another object is to lure and attract fish by both visual and audible means.

Other objects are to provide an attachment for a fishline of the nature described which is simple and economical to construct, easy to use, durable in form, dependable in action, adaptable to various kinds of fish and conditions of water, and which is highly effective for accomplishing its intended results.

These together with other objects will become more fully apparent upon reference to the following description.

In the drawings:

Fig. 1 is a side elevation of a fishline, a leader having an end connected to a fishhook, a spinner connected to the leader, and a fishline attachment constructed according to the principles of the present invention interconnecting the fishline and the end of the leader opposite to the end connected to the hook. The attachment of the present invention is shown in side elevation with the fishline and the leader connected to the fin so as to cause the attachment to submerge when drawn through the water.

Figure 1:
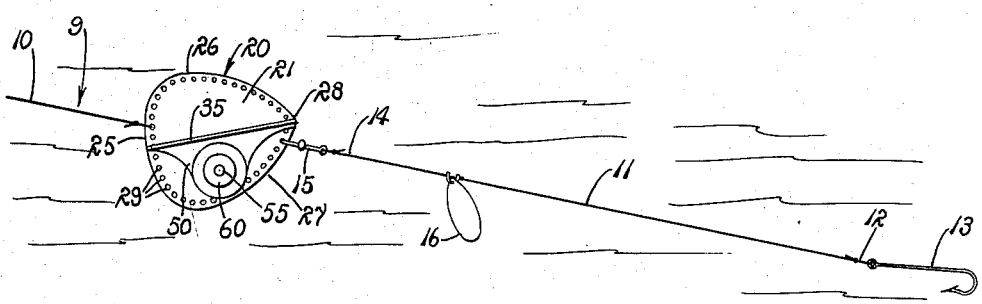
Figure 2:
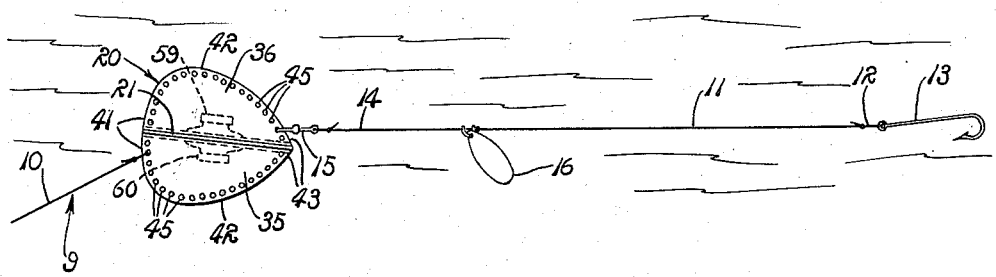
Fig. 2 is a top plan of the same elements shown in Fig. 1 but with the fishline and leader connected to wings of the device.
Figure 3:
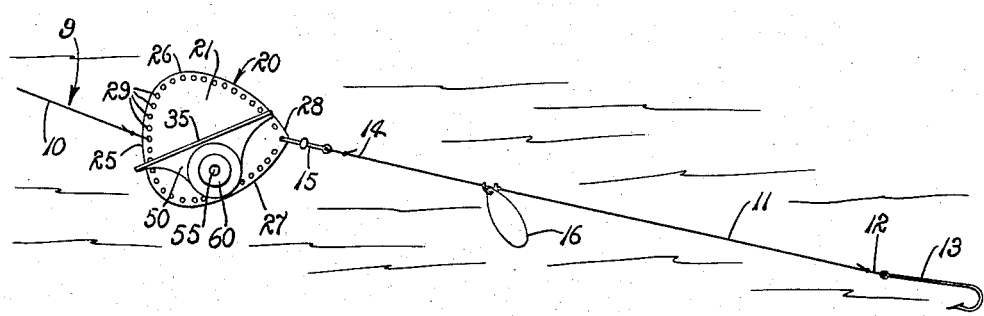
Fig. 3 is a side elevation similar to Fig. 1 showing the wings downwardly declined to cause the device to submerge but with the fishline and the leader connected along the axis of symmetry of the fin.

Referring more particularly to the drawings, a fishline is partially illustrated in Figs. 1, 2 and 3 and is indicated by the numeral 9. The line includes a main portion 10, leader 11, preferably of fine wire, which provides a rear end 12 connected to a fishhook 13, and a forward end 14 connected to a swivel 15. A spinner 16 of any well-known form is connected to the leader intermediate its ends for rotational or spinning movement around the leader as an axis. It is not essential that the swivel be used to effect operation of the subject invention but it is shown as a preferred arrangement.

An attachment 20, constructed in accordance with the principles of the present invention, is shown interconnecting the main portion of the fishline 10 and the swivel 15. The attachment provides a submersible body having a generally heart-shaped fin or keel member 21 adapted to be disposed in vertical position in use and accordingly, hereinafter referred to as being in such a position. The fin is preferably constructed of thin, shiny aluminum or other light metal, or clear plastic, but may be made of a variety of materials, and provides opposite plane side surfaces 22 and 23 polished to give a shiny appearance. The fin has a convex end edge 25, convex upper and lower edges 26 and 27 interconnected with the end edge along smooth curves and endwardly converging to a tip 28. The fin is substantially symmetrical about a longitudinal axis extended between the convex end edge and the tip. Further, the fin includes a plurality of substantially equally spaced apertures 29 along the upper, lower, and end edges. The apertures are shown along the entire circumference of the fin but, as the description proceeds, it will be evident that at least insofar as one aspect of the invention is concerned, the apertures need only be provided along the central part of the end edge and along the upper and lower edges closely adjacent to the tip. Further, the fin has a hole 30, best seen in Fig. 5, located in the lower half of the fin between the axis of symmetry and the lower edge.

The attachment 20 further includes a pair of symmetrical generally semi-heart-shaped wings 35 and 36, preferably of the same material as the fin 21, and of substantially the same size and shape so that when fitted together along their substantially straight inner edges 37 they form a member of substantially the same size and shape as the fin 21. This is best seen in Fig. 2. Each wing has an upper plane surface 39, and a lower plane surface 40. These surfaces are preferably polished so as to present a shiny appearance. Further, each of the wings has a convex end edge 41, an outwardly convex side edge 42 connected to its respective end edge along a smooth curve and endwardly tapering toward a tip 43. Each of the wings also has a plurality of substantially equally spaced perforations 45 along the end and side edges thereof. It will be understood as the description proceeds, however, that these perforations need only be provided in the end edges and along the side edges adjacent to the tip, at least insofar as one aspect of the invention is concerned.

Both of the wings 35 and 37 have mounting flanges 50 perpendicularly extended from their inner edges 37 respectively, and these flanges are provided with openings 51. The wings are mounted on opposite sides 22 and 23 of the fin 21 by placing the flanges in flush engagement with the fin and bringing the openings into registration with the hole 30.

Thereupon, an elongated pin or bolt 55 is extended transversely of the fin 21 through the openings 51 and the hole 30 so that a head end 56 extends outwardly on one side of the fin and the adjacent mounting flange 50, and a threaded end 57 extends outwardly on the other side of the fin and the adjacent mounting flange. A knurled head 59 of predetermined weight is fixed on the head end of the pin and fitted flush against the adjacent mounting flange, and a knurled nut 60 of substantially the same size, shape and weight as the head provides a threaded bore 61 screw-threadably turned on the threaded end of the pin for flush engagement with the adjacent mounting flange. The head and the nut are preferably made of lead or other relatively heavy material so that the weight of the attachment is greater below its longitudinal axis than above.

Figure 4:
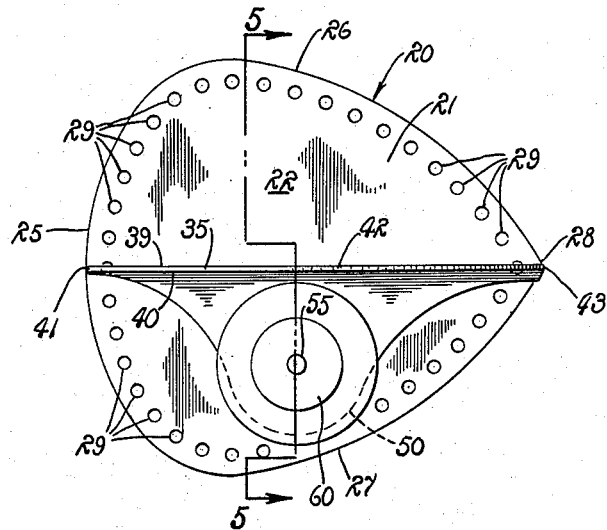
Fig. 4 is a somewhat enlarged side elevation of the attachment alone with the wings in neutral positions.
Figure 5:
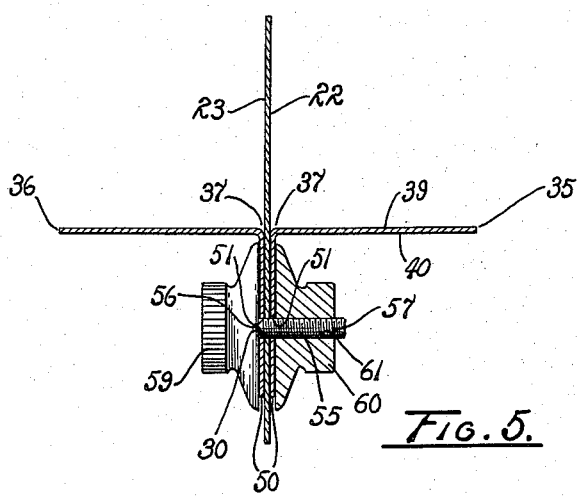
Fig. 5 is a vertical transverse section of the attachment, taken on line 5—5 of Fig. 4.

Thus, the wings 35 and 36 are outwardly extended from opposite sides of the fin 21 in substantially perpendicular relation to the fin. By loosening the nut 60, the wings may be pivotally adjusted independently of each other between a substantially horizontal neutral position in a substantially common plane containing the axis of symmetry of the fin, as indicated in Figs. 1, 4, and 5, positions upwardly inclined with respect to said neutral position, not specifically illustrated, or positions downwardly declined with respect to said neutral position, as typified in Fig. 3. The wings may be fixed in any of these positions upon tightening of the nut, as will be evident, or alternatively for certain fishing operations, the flanges may be permanently fastened to the fin in any desired position, albeit preferably their neutral positions.

Operation

The operation of the described embodiment of the subject invention is believed to be readily apparent and is briefly summarized at this point. The attachment 20 can be connected to the fishline 10 in several different ways some of which will be considered in detail.

As shown in Fig. 3, the attachment 20 may be connected to the line 10 and leader 11 by tying the line to the edge 25 of the vertical fin 21 through the aperture 29 lying on the axis of symmetry. The swivel 15 on the leader 11 may be connected to the aperture 29 located precisely in the tip 28 or, stated otherwise, the aperture on the axis of symmetry at the opposite end of the fin from the fishline. Further, but as shown in Figs. 4 and 5, the wings 35 and 36 may be adjusted to their neutral positions in a substantially horizontal common plane containing the axis of symmetry of the fin. Assuming the attachment 20 to be connected to the fishline 10 as above described, the fishline is pulled through the water with the hook 13 trailing along behind. As the spinner 16 rotates around the leader 11 in the usual manner, the fin 21 and the wings 35 and 36 resist rotation of the line incident to the action of the spinner. The weights 59 and 60 hold the fin in substantially vertical position with the wings extended outwardly in horizontal planes. Thus, both the spinner and the leader may rotate and twist on the swivel 15 but the rotational force thus imposed will not affect the main line because of the interposition of the subject attachment. The fin acts as a keel to stabilize movements of the attachment and forces imposed thereon so that the attachment, in effect, absorbs and dampens rotational forces imposed by the spinner.

If it is desired to submerge the hook 13 deeper than is obtainable by the weight of the attachment 20, the hook, and the spinner 16 alone, either one of two adjustments may be made. First, with the line 10 and the leader 11 connected as in the first example described above, the nut 60 is loosened and the wings 35 and 36 downwardly declined. This is as shown in Fig. 3. Then when the line pulls the attachment forwardly, water pressure on the upper surfaces 39 of the wings forces the attachment downwardly in the water. Secondly, the same result may be obtained by leaving the wings in their neutral horizontal positions and by changing the connections of the line and the leader to the attachment. Thus, the line is connected in one of the apertures 29 in the upper half of the fin 21, that is above the wings, and the swivel 15 is connected in one of the apertures 29 adjacent to but below the tip 28. Generally, the apertures selected for this purpose are equally spaced from the axis of symmetry although above and below such axis. When the line is then pulled forwardly in the water, the attachment dips slightly downwardly since the leader and the line tend to align themselves and are in acute angular relation to the axis of symmetry of the attachment. The wings 35 and 36 are downwardly declined relative to a horizontal and cause the attachment, and thus the hook, to submerge because of the force of the water against their upper surfaces 39.

Obviously, if it is desired to resist submersion of the hook, such as to counteract the effect of the weighted head 59 and nut 60, the attachment is adjusted in a manner opposite to that described in the preceding paragraph. That is, the wings 35 and 36 are upwardly inclined relative to the axis of symmetry of the fin 21, or the line 10 and swivel 15 are respectively connected to the fin below and above the wings.

If it is desired to position the hook 13 outwardly from a boat, not shown, and to cause the hook to move in a path in laterally spaced, generally parallel relation to the path of movement of the boat, the wings 35 and 36 are placed in their neutral positions. As shown in Fig. 2, the line 10 is connected to one of the perforations 45 in the inner wing 36 adjacent to the boat and in the end edge 41 while the swivel is connected to one of the perforations in the outer wing on the other side of the fin and near the tip 43. Thus, the line and the leader 11 are on opposite sides of the fin. Generally, they are connected in perforations equally spaced from the fin. When the line 10 is pulled outwardly from the wing 35 laterally of the attachment 20, as seen in Fig. 2, the force of the water against the fin resists movement of the device toward the boat. The resultant forces on the attachment may be adjusted by selecting various perforations for connection to the line and the leader so that the path of travel of the attachment is substantially parallel to the path of the boat.

If it is further desired to cause the attachment 20 to submerge while in laterally spaced relation to the boat, not shown, the wings 35 and 36 are downwardly declined. As will be evident, the attachment may be utilized in the same manner on the opposite side of a boat by reversing the connections described.

Still further, although shown and described with the convex end edges 25 and 41 as leading edges with the tips 28 and 43 trailing, the attachment works equally as well in the reverse direction. The invention is obviously not limited to the shape of the device shown.

The attachment is also found to have attracting properties for fish. It is visually attractive because of its many surfaces which are of bright and shiny appearance and which reflect sunlight in the water to attract the fish. Further, the provision of the apertures 29 and perforations 45 creates a sound audible to the fish as it is pulled through the water. In this regard it is to be noted that preferably the apertures and perforations are provided around the entire peripheries of the fin 21 and wings 35 and 36, as illustrated, in order to obtain maximum sound effect.

From the foregoing it will be understood that a highly effective attachment for a fishline has been provided which minimizes and resists twisting of the fishline, especially as a result of the action of a spinner; which adjustably controls the depth of the fishhook and attached line without the use of expendable weights or relying on weights for deep submerision; which enables control of the path of travel of the fishhook; and which possesses characteristics adapted to attract fish. The device is simple to construct, economical to use, and has been found to highly effective in actual practice.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A combined fishline stabilizer and directional control device adapted to be pulled through the water on a fishline comprising an elongated body having opposite ends, a longitudinal axis of symmetry extended between such ends, a substantially heart-shaped fin adapted to be positioned in a substantially vertical plane having a convex end edge and upper and lower edges tapered from the convex edge to a tip at the opposite end of the body, a pair of semi-heart-shaped wings outwardly extended normal to and on opposite sides of the fin having mounting flanges downwardly extended against the fin, the wings having convex end edges adjacent to the convex end edge of the fin and side edges tapered from their convex edges toward tips at the opposite end of the body, the fin and the wings having apertures and perforations, respectively, in their convex end edges and adjacent to their tips for enabling connection of the body to a fishline; an elongated bolt transversely extended through the mounting flanges and the fin having opposite ends extended outwardly of the flanges and mounting the wings for independent elevationally pivotal movement between substantially neutral positions coplanar with the longitudinal axis of the body and positions upwardly and downwardly sloped with respect to the neutral positions; a weighted head secured to one end of the bolt; and a weighted nut screw-threadably connected to the opposite end of the bolt from the head and being of substantially the same weight as the head whereby the weight of the body is greater below its longitudinal axis than above for maintaining the fin in substantially vertical position while being drawn through the water.

2. In combination with a fishline having a main portion and a leader having forward and rearward ends, a fishhook connected to one end of the leader, and a spinner connected to the leader for rotational movement around the leader as an axis; a combined fishline stabilizer and depth control device comprising a body having opposite ends, a flat generally heart-shaped vertical fin having opposite plane side surfaces, a convex end edge, convex upper and lower edges converging from the end edge to a tip at the opposite end of the body, and a plurality of substantially equally spaced apertures along said upper, lower and end edges, said fin being substantially symmetrical about a longitudinal axis extended between said end edge and the tip; a pair of generally semi-heart-shaped wings being of substantially the same size and shape as the fin when fitted together, extended outwardly in substantially perpendicular relation from opposite surfaces of the fin having upper surfaces, convex end edges, convex lateral edges converging from their respective end edges to tips at the opposite end of the body, a plurality of substantially equally spaced perforations along the edges of the wings, and mounting flanges downwardly extended in flush engagement with opposite surfaces of the fin; a pin extended transversely through the mounting flanges and the fin having a threaded end on one side of the fin and a head end on the other side of the fin and mounting the wings for independent elevational pivotal movement around the pin as an axis between substantially horizontal neutral positions in a substantially common plane containing the axis of symmetry of the fin and positions upwardly inclined or downwardly declined with respect to said neutral positions; a weighted head on the head end of the pin; and a weighted nut of substantially the same size, shape and weight as the head adjustably screw-threaded on the threaded end of the pin whereby the wings can be selectively adjusted in positions by loosening and tightening the nut, the forward end of the leader being selectively attachable to an aperture or a perforation above or below the wings, or on one side or the other of the fin adjacent to said tips and the main portion of the fishline being attachable to an aperture or a perforation above or below the wings, or on one side or the other of the fin along said end edges, the main portion of the fishline and the leader being connected at any one time to the wings or to the fin and further at any one time being on opposite sides of the fin or above and below the wings, respectively, so that when the fishline is pulled through the water, the fins and wings tend to resist twisting of the line as a result of rotation of the spinner, and whereby inclination or declination of the wings tends to move the device upwardly or downwardly, respectively, in the water.

References Cited in the file of this patent

UNITED STATES PATENTS

| | | |
|---|---|---|
| 1,701,444 | Darr | Feb. 5, 1929 |
| 2,219,886 | Blomme | Oct. 29, 1940 |
| 2,473,644 | Groza | June 21, 1949 |
| 2,542,347 | Muller | Feb. 20, 1951 |
| 2,622,362 | Jensen | Dec. 23, 1952 |
| 2,726,475 | Wiselha | Dec. 13, 1955 |